(12) United States Patent
Ano

(10) Patent No.: US 11,353,971 B2
(45) Date of Patent: Jun. 7, 2022

(54) METHOD FOR CONTROLLING DISPLAY DEVICE, AND DISPLAY DEVICE

(71) Applicant: SEIKO EPSON CORPORATION, Tokyo (JP)

(72) Inventor: Takahiro Ano, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/130,067

(22) Filed: Dec. 22, 2020

(65) Prior Publication Data
US 2021/0191532 A1 Jun. 24, 2021

(30) Foreign Application Priority Data
Dec. 23, 2019 (JP) .............................. JP2019-231181

(51) Int. Cl.
*G06F 3/038* (2013.01)
*H04N 9/31* (2006.01)
*G06F 3/0354* (2013.01)

(52) U.S. Cl.
CPC .......... *G06F 3/038* (2013.01); *G06F 3/03545* (2013.01); *H04N 9/3179* (2013.01)

(58) Field of Classification Search
CPC .... G06F 3/038; G06F 3/03545; H04N 9/3179
See application file for complete search history.

(56) References Cited

U.S. PATENT DOCUMENTS

| 6,339,431 | B1* | 1/2002 | Ohmori | G06F 3/0481 345/585 |
|---|---|---|---|---|
| 2004/0150627 | A1* | 8/2004 | Luman | G06Q 10/10 345/173 |
| 2007/0146387 | A1* | 6/2007 | Kodama | G06F 1/169 345/619 |
| 2013/0093666 | A1* | 4/2013 | Nagai | G06F 3/04883 345/156 |
| 2013/0300658 | A1* | 11/2013 | Endo | G06F 3/04883 345/157 |
| 2013/0307766 | A1* | 11/2013 | Amathnadu | G06K 9/00355 345/156 |
| 2014/0212042 | A1* | 7/2014 | Shibata | G06F 3/04883 382/188 |
| 2014/0267102 | A1* | 9/2014 | Ota | G06F 3/1423 345/173 |
| 2015/0002435 | A1* | 1/2015 | Shimizu | G06F 3/04883 345/173 |
| 2017/0090707 | A1* | 3/2017 | Imai | G06F 1/1639 |

(Continued)

FOREIGN PATENT DOCUMENTS

| JP | 2017-116900 A | 6/2017 |
|---|---|---|
| JP | 2017-173675 A | 9/2017 |

*Primary Examiner* — Ariel A Balaoing
(74) *Attorney, Agent, or Firm* — Oliff PLC

(57) ABSTRACT

Image information and identification information identifying an external device are acquired from the external device. An image based on the image information is displayed on a display surface. A drawing object is generated from a trajectory of a pointing unit in a drawing area on the display surface based on the image as a reference. The drawing object is stored in association with the identification information into a memory. The drawing object associated with the identification information in the memory is displayed on the display surface, as linked to the image.

9 Claims, 7 Drawing Sheets

(56) References Cited

U.S. PATENT DOCUMENTS

| | | | |
|---|---|---|---|
| 2017/0270700 A1* | 9/2017 | Ano | G06T 11/60 |
| 2018/0047322 A1* | 2/2018 | Ano | G09G 3/02 |
| 2019/0050130 A1* | 2/2019 | Park | G06F 13/102 |

* cited by examiner

FIG. 5
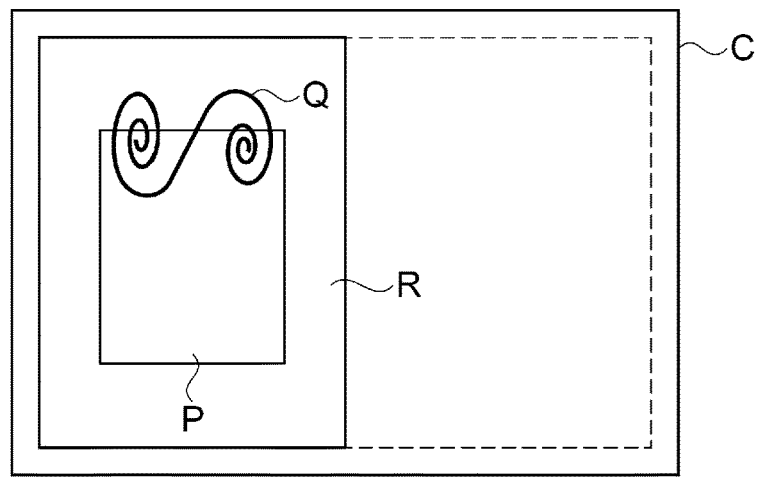
FIG. 6
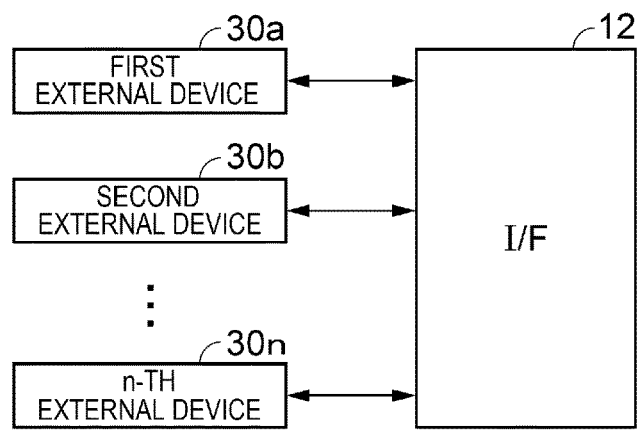
FIG. 7
| IMAGE INFORMATION | IDENTIFICATION INFORMATION | DRAWING AREA |
|---|---|---|
| FIRST IMAGE INFORMATION | FIRST IDENTIFICATION INFORMATION | FIRST DRAWING AREA |
| SECOND IMAGE INFORMATION | SECOND IDENTIFICATION INFORMATION | SECOND DRAWING AREA |
| ... | ... | ... |

METHOD FOR CONTROLLING DISPLAY DEVICE, AND DISPLAY DEVICE

The present application is based on, and claims priority from JP Application Serial Number 2019-231181, filed Dec. 23, 2019, the disclosure of which is hereby incorporated by reference herein in its entirety.

BACKGROUND

1. Technical Field

The present disclosure relates to a method for controlling a display device, and a display device.

2. Related Art

JP-A-2017-173675 discloses a display device which erases a drawing made on an image with a pen-type pointing unit when ending the display of the image, and displays a drawing stored in association with the content of the image when displaying the image again.

However, the technique described in JP-A-2017-173675 has a problem in that the processing load on the display device increases due to a constant need to analyze the content of the displayed image.

SUMMARY

An aspect of the present disclosure is directed to a method for controlling a display device including: acquiring, from an external device, image information and identification information identifying the external device; displaying an image based on the image information, on a display surface; generating a drawing object from a trajectory of a pointing unit in a drawing area on the display surface based on the image as a reference; storing the drawing object in association with the identification information into a memory; and displaying the drawing object associated with the identification information in the memory, on the display surface, as linked to the image.

Another aspect of the present disclosure is directed to a display device including: an interface acquiring, from an external device, image information and identification information identifying the external device; a display unit displaying an image based on the image information, on a display surface; a generation circuit generating a drawing object from a trajectory of a pointing unit in a drawing area on the display surface based on the image as a reference; a memory storing the drawing object in association with the identification information; and a control circuit controlling the display unit to display the drawing object associated with the identification information in the memory, on the display surface, as linked to the image.

BRIEF DESCRIPTION OF THE DRAWINGS

FIG. 5 explains still another example of the display surface.

FIG. 6 explains an interface to which a plurality of external devices are coupled.

FIG. 7 is a table explaining an example of a drawing area table.

DESCRIPTION OF EXEMPLARY EMBODIMENTS

Figure 1:
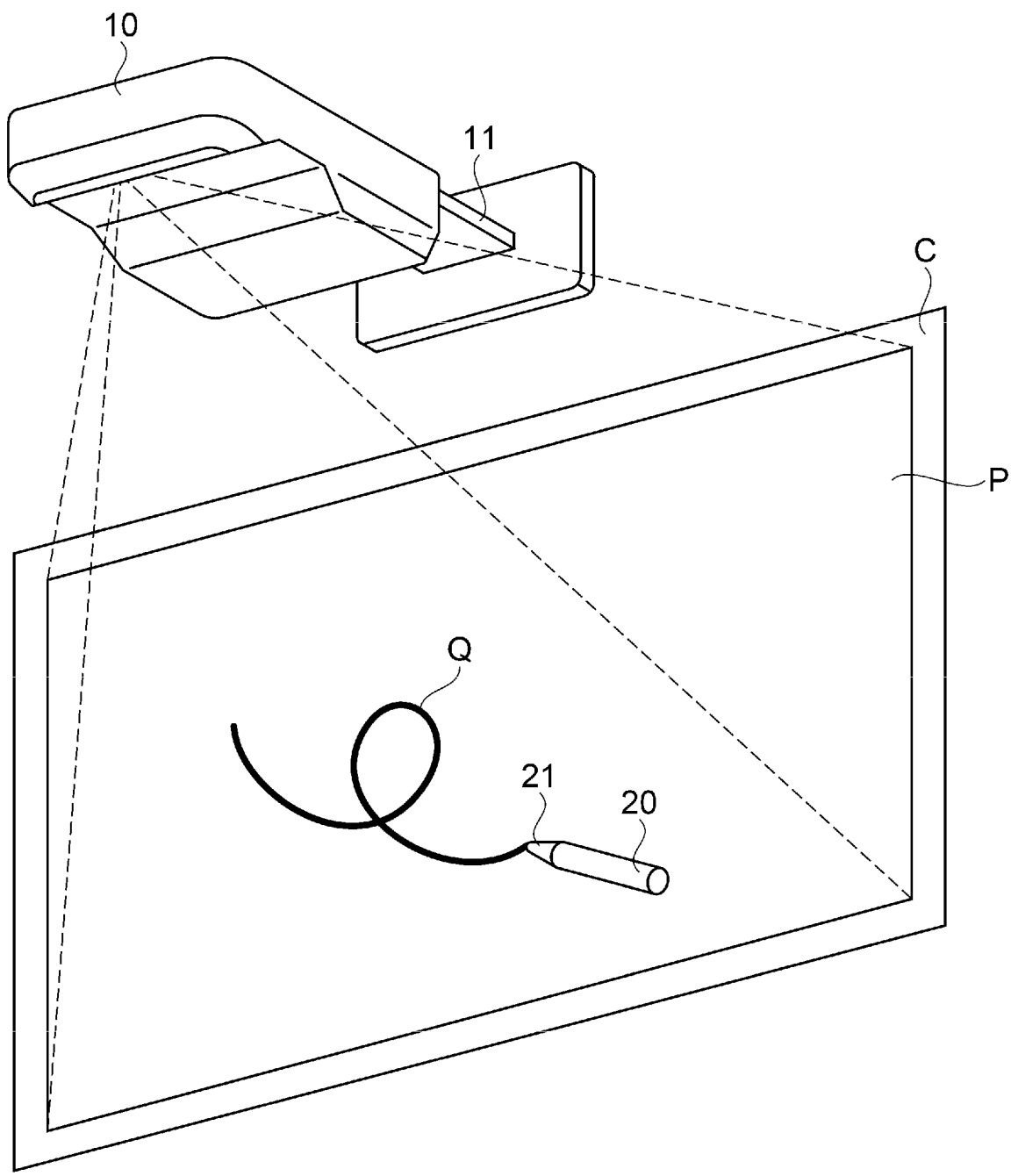
FIG. 1 is a perspective view explaining a display device according to an embodiment.

An embodiment of the present disclosure will now be described with reference to the drawings. As shown in FIG. 1, a display device 10 is, for example, a projector which projects light representing an image P onto a display surface C and thus displays the image P on the display surface C. The display device 10 is fixed to a wall surface via a fixing member 11. The display surface C is arranged, for example, along the wall surface where the fixing member 11 is fixed. As the display surface C, for example, a white flat surface such as a rolling screen or whiteboard can be employed. The display device 10 may be fixed to a ceiling surface. When the display surface C is the surface of a whiteboard, the display device 10 may be fixed at an upper end part of the whiteboard.

The display device 10 displays a drawing object Q drawn, for example, with a pen-type pointing unit 20, on the display surface C. The pointing unit 20 has, for example, a light-emitting unit emitting infrared light and a touch sensor detecting a presence/absence of a touch on the display surface C, in a tip part 21. The light-emitting unit changes the light emission pattern according to the presence/absence of a touch detected by the touch sensor. The display device 10 can detect the presence/absence of a touch on the display surface C by the pointing unit 20 and the position of the tip part 21, based on the light from the light-emitting unit in the tip part 21. The display device 10 generates the drawing object Q from a trajectory of the pointing unit 20, which is the position of the tip part 21 changing every moment during the touch on the display surface C.

Figure 2:
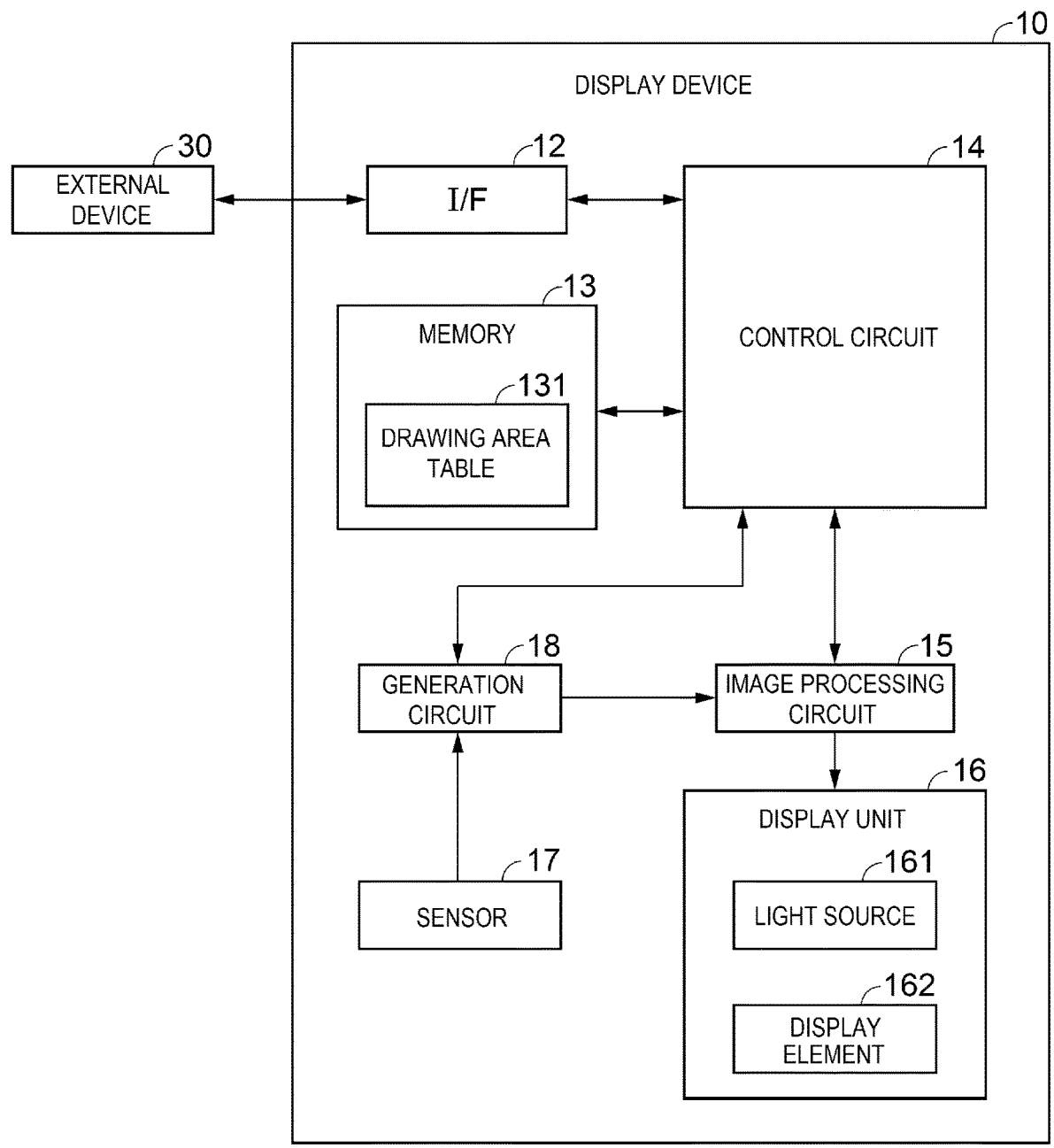
FIG. 2 is a block diagram explaining a basic configuration of the display device according to the embodiment.

As shown in FIG. 2, the display device 10 has an interface (I/F) 12, a memory 13, a control circuit 14, an image processing circuit 15, a display unit 16, a sensor 17, and a generation circuit 18. The I/F 12 acquires, from an external device 30, image information and identification information identifying the external device 30 and outputs the image information and the identification information to the control circuit 14. The external device 30 is any device having the function of outputting image information to the display device 10, such as a personal computer, smartphone, camera, movie player, television tuner, or game machine. The I/F 12 has a terminal of at least one type selected from input terminals such as an HDMI (trademark registered) terminal, HDBaseT (trademark registered) terminal, DisplayPort terminal, VGA terminal, RCA terminal, and S terminal. The I/F 12 can have a communication circuit that establishes a communication link such as a local area network (LAN) with the external device 30. The communication link between the I/F 12 and the external device 30 may be wired or wireless.

The external device 30 outputs, for example, image information representing the image P and identification information identifying the external device 30 to the display device 10 in response to being communicatively coupled to the I/F 12. As the identification information, for example, information defined by Extended Display Identification Data (EDID) can be employed. Specifically, the identification information can be each of data of the resolution, refresh rate, color depth, audio format and the like of the image P, or a combination of the data. For example, when the external device 30 is coupled to the I/F 12 via a wireless network or the like, and the image information and the user of the external device 30 correspond to each other, an identifier identifying the user in the network including the external device 30 may be employed as the identification information.

The control circuit 14 has a processing circuit forming a processing device of a computer, and a storage device that is a computer-readable storage medium. The control circuit 14 includes, for example, a central processing unit (CPU). The processing circuit processes necessary computations for the display device 10 to operate. The processing circuit executes, for example, a control program stored in the storage device and thus controls each part of the display device 10 to implement each function described in the embodiment. The storage device stores a control program representing a series of necessary processes for the display device 10 to operate, and various data. The storage device is, for example, formed of a semiconductor memory. The storage device is not limited to a non-volatile auxiliary storage device and can include a volatile main storage device such as a register or cache memory. The control circuit 14 may be formed of a single piece of hardware, or two or more separate pieces of hardware.

The image processing circuit 15, under the control of the control circuit 14, generates the image P to be displayed on the display surface C. Specifically, the image processing circuit 15 generates an image signal representing the image P, based on the image information inputted to the I/F 12 from the external device 30. The image processing circuit 15 successively outputs the generated image to the display unit 16. The image processing circuit 15 has a rendering engine, a graphics memory, and the like. The image processing circuit 15 may function as a circuit forming a part of the control circuit 14. The image processing circuit 15 may also generate an image signal representing computer graphics generated by the control program for the control circuit 14.

The display unit 16 is, for example, a projection device having a light source 161, a display element 162 such as a liquid crystal light valve having a plurality of pixels, and an optical system, not illustrated, such as a lens and a mirror. The light source 161 may be any one of various discharge lamps or a laser light source. Light emitted from the light source 161 is introduced to the display element 162 by the optical system. The display element 162 modulates the introduced light according to an image signal inputted from the image processing circuit 15. The display unit 16 projects the light that has travelled through the display element 162 onto the display surface C, using the optical system, and thus displays the image P based on the image information. As other systems of the display unit 16, a system that uses a mirror device scanning the display surface C with the modulated light and a system that uses a digital micromirror device controlling the reflection of light at each pixel can be employed.

The sensor 17 detects the position of the pointing unit 20 on the display surface C. The sensor 17 is, for example, an image sensor having a solid-state image pickup element. The position and orientation of the sensor 17 are adjusted in such a way that the angle of view includes a maximum projection range of the display unit 16. The sensor 17 has, for example, an infrared transmission filter which blocks visible light and transmits infrared light. The sensor 17 detects infrared light emitted from the tip part 21 of the pointing unit 20 via the infrared transmission filter and thus successively detects the position of the tip part 21 on the display surface C.

Figure 3:
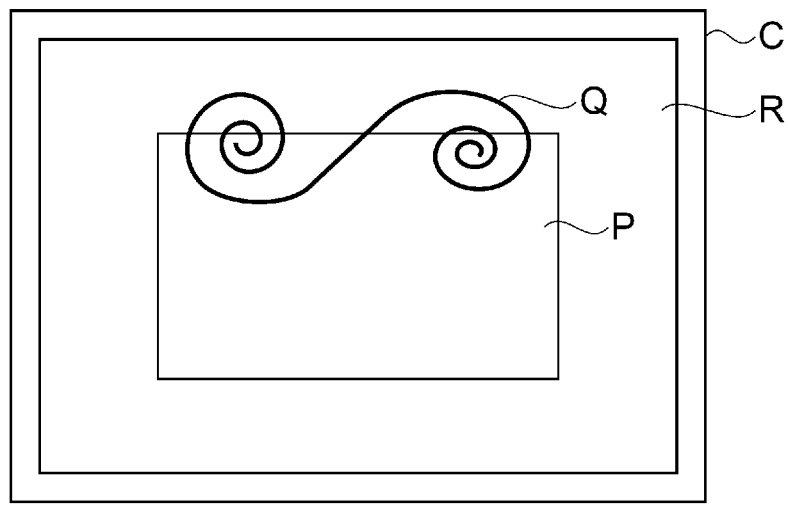
FIG. 3 explains an example of a display surface.

As shown in FIG. 3, the generation circuit 18 detects a trajectory of the tip part 21 in a drawing area R on the display surface C based on the image P as a reference, from the position of the tip part 21 successively detected by the sensor 17. The drawing area R is defined by the control circuit 14, based on the image P as a reference on the display surface C. On the display surface C, for example, the drawing area R includes the image P and is broader than the image P. In the example shown in FIG. 3, the drawing area R substantially coincides with the maximum projection range of the display unit 16. The generation circuit 18 generates the drawing object Q from the trajectory of the pointing unit 20 in the drawing area R. The drawing object Q may be generated from a plurality of trajectories that do not continue to each other. The drawing object Q is an object drawn by the user using the pointing unit 20 in the drawing area R based on the image P as a reference.

The memory 13 stores the drawing object Q in association with the identification information. Specifically, the memory 13, under the control of the control circuit 14, stores a drawing area table 131 in which the identification information of the external device 30 and the drawing object Q in the drawing area R based on the image P as a reference are registered in association with each other. The control circuit 14 adds a record for each identification information in the drawing area table 131 in response to acquiring the image information and the identification information from the external device 30. The control circuit 14 updates a field corresponding to the drawing object Q, linked to update of the drawing object Q by the generation circuit 18. The memory 13 continues the storage of the drawing object Q during a stop of the display of the image P. Thus, the drawing object Q is stopped simultaneously with a stop of the display of the image P but can be displayed again simultaneously with a resumption of the display of the image P. The memory 13 may be formed as a storage device of the control circuit 14.

The image processing circuit 15 acquires the drawing object Q registered in the drawing area table 131, as object information. The image processing circuit 15, under the control of the control circuit 14, generates an image signal representing a state where the drawing object Q is superimposed on the image P, based on the image information from the external device 30 and the object information, and outputs the image signal to the display unit 16. Thus, the display unit 16 displays an image in which the drawing object Q is superimposed on the image P.

Figure 4:
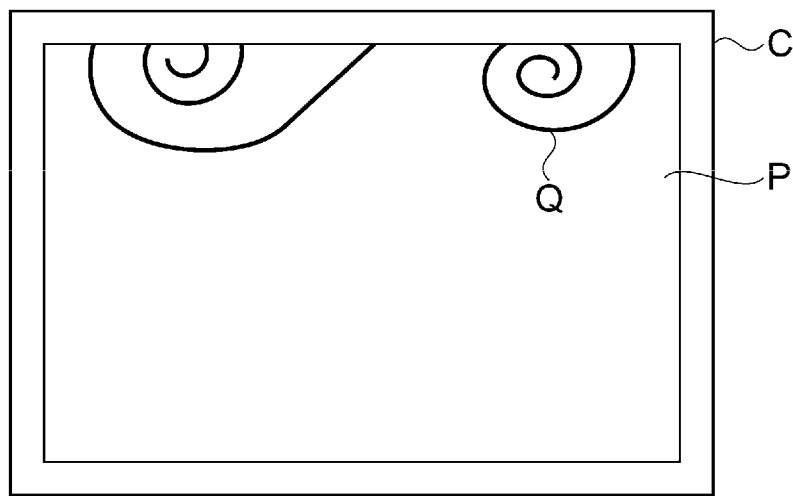
FIG. 4 explains another example of the display surface.

As shown in FIG. 4, the control circuit 14 controls the display unit 16 to display the drawing object Q associated with the identification information in the drawing area table 131, on the display surface C, as linked to the image P from the external device 30 identified by the identification information. That is, the position of the drawing object Q on the display surface C is linked to the position of the image P. Similarly, the size of the drawing object Q on the display surface C is linked to the size of the image P. In this way, the control circuit 14 causes the change in the position and magnification of the drawing object Q to coincide with that of the image P and thus can fix the positional relationship of the drawing object Q with the image P. The example shown in FIG. 4 explains a state where a part of the drawing object Q that extends out of the image P is not displayed, when the image P is maximized on the display surface C.

As shown in FIG. 5, the control circuit 14 may fix the positional relationship of the drawing area R with the image P. In the example shown in FIG. 5, the magnification in the horizontal direction of the drawing area R is ½ of the state shown in FIG. 3, which coincides with the magnification in the horizontal direction of the image P. Alternatively, the control circuit 14 may discard the drawing area R except the drawing object Q at a point when the range of the image P on the display surface C is changed.

For example, as shown in FIG. 6, the I/F 12 may acquire identification information from each of a plurality of external devices, for example, a first external device 30*a* to an n-th external device 30*n*, where n is an integer equal to or greater than 2. A case where the I/F 12 is coupled to two external devices, that is, the first external device 30*a* and the second external device 30*b*, will now be described as an example.

As shown in FIG. 7, the drawing area table 131 can have the same number of records as the number of types of the external device 30. For example, when the first external device 30*a* outputs first image information and the second external device 30*b* outputs second image information, the I/F 12 acquires first identification information identifying the first external device 30*a* and second identification information identifying the second external device 30*b*. In the drawing area table 131, a field of the drawing area that differs from one identification information to another is defined under the control of the control circuit 14. The identification information in the drawing area table 131 can also include information identifying a connection method for the I/F 12, such as the input terminal and the type of wireless connection.

The I/F 12 acquires the first image information and the first identification information from the first external device 30*a* and outputs the first image information and the first identification information to the control circuit 14. Similarly, the I/F 12 acquires the second image information and the second identification information from the second external device 30*b* and outputs the second image information and the second identification information to the control circuit 14. In the case where the first identification information is not yet registered in the drawing area table 131 at the point when the first identification information is inputted, the control circuit 14 adds a record in which the first identification information is registered, to the drawing area table 131. Similarly, when the second identification information is not yet registered in the drawing area table 131 at the point when the second identification information is inputted, the control circuit 14 adds a record in which the second identification information is registered, to the drawing area table 131.

Figure 8:
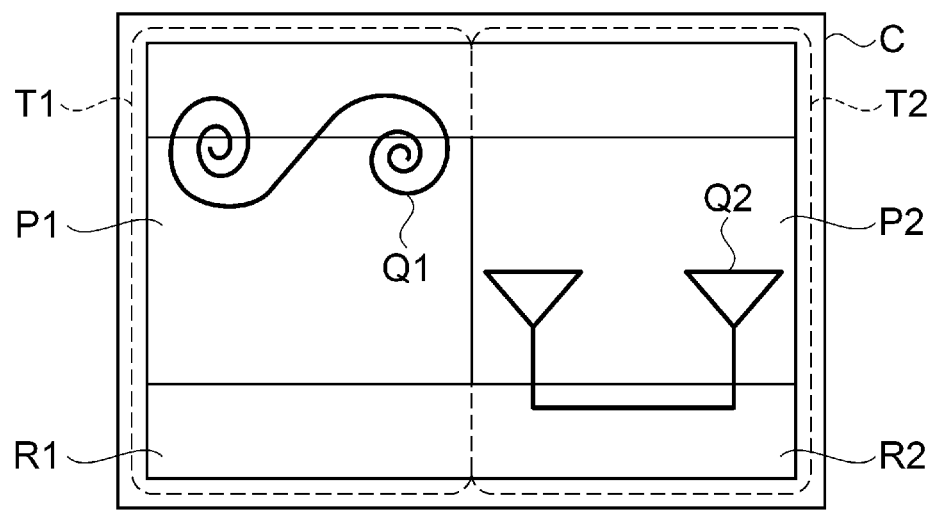
FIG. 8 explains an example of the display surface displaying a plurality of images.

As shown in FIG. 8, the display unit 16 displays a first image P1 based on the first image information and a second image P2 based on the second image information. The generation circuit 18 generates a first drawing object Q1 from a trajectory of the pointing unit 20 in a first drawing area R1 based on the first image P1 as a reference. On the display surface C, the first drawing area R1 includes the first image P1 and is broader than the first image P1. Similarly, the generation circuit 18 generates a second drawing object Q2 from a trajectory of the pointing unit 20 in a second drawing area R2 based on the second image P2 as a reference. On the display surface C, the second drawing area R2 includes the second image P2 and is broader than the second image P2. Since each drawing area R is defined as broader than the image P, the drawing object Q can be drawn, effectively utilizing a margin outside the image P. The second drawing object Q2 may be drawn with a different pointing unit from the pointing unit 20.

The control circuit 14 stores the first drawing object Q1 in association with the first identification information and the second drawing object Q2 in association with the second identification information, into the memory 13. That is, the first drawing object Q1 is registered in the record of the first identification information in the drawing area table 131. The second drawing object Q2 is registered in the record of the second identification information in the drawing area table 131. In the example shown in FIG. 7, the "first drawing area" means the first drawing object Q1 drawn in the first drawing area R1, and the "second drawing area" means the second drawing object Q2 drawn in the second drawing area R2.

In the example shown in FIG. 8, the control circuit 14 controls the display unit 16 to display the first image P1 and the first drawing object Q1 in a first range T1 on the display surface C and display the second image P2 and the second drawing object Q2 in a second range T2 that is different from the first range T1. The first image P1 and the first drawing object Q1, and the second image P2 and the second drawing object Q2, are displayed in such a way as not to be superimposed on each other on the display surface C. The control circuit 14 displays the second drawing object Q2 associated with the second identification information in the memory 13, on the display surface C, as linked to the second image P2. Thus, the control circuit 14 can prevent a drop in the visibility of the first drawing object Q1 and the second drawing object Q2.

Figure 9:
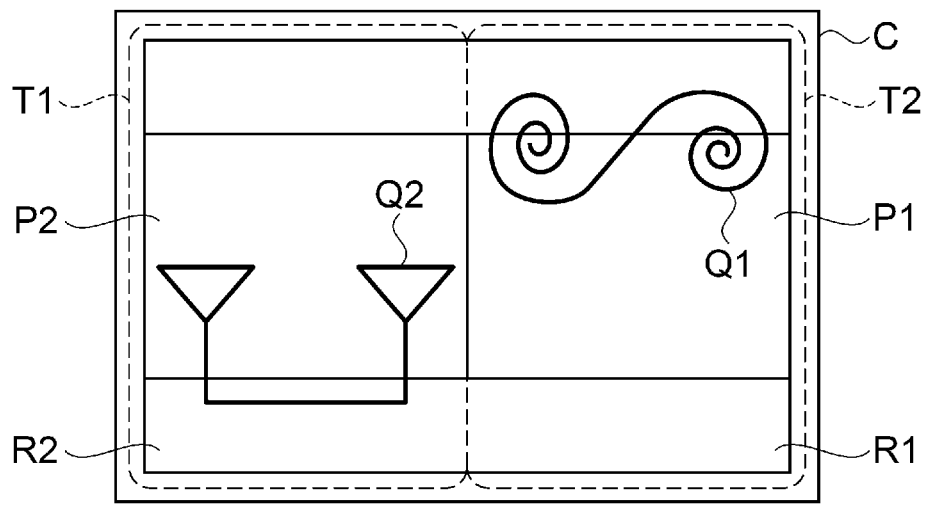
FIG. 9 explains another example of the display surface displaying a plurality of images.

As shown in FIG. 9, the control circuit 14 can change, for example, the range of the first image P1 and the first drawing object Q1 on the display surface C from the first range T1 to the second range T2. FIG. 9 explains the state where the range of the first image P1 and the first drawing object Q1 and the range of the second image P2 and the second drawing object Q2 are exchanged from the state shown in FIG. 8. That is, when displaying the first image P1 and the first drawing object Q1 displayed in the first range T1 on the display surface C into the second range T2, the control circuit 14 erases the first image P1 and the first drawing object Q1 in the first range T1. In this way, even when the range of the image P is changed, the display device 10 links the drawing object Q associated with the identification information of the image P to the range of the image P and thus can easily prevent a misalignment in the positional relationship between the image P and the drawing object Q.

Figure 10:
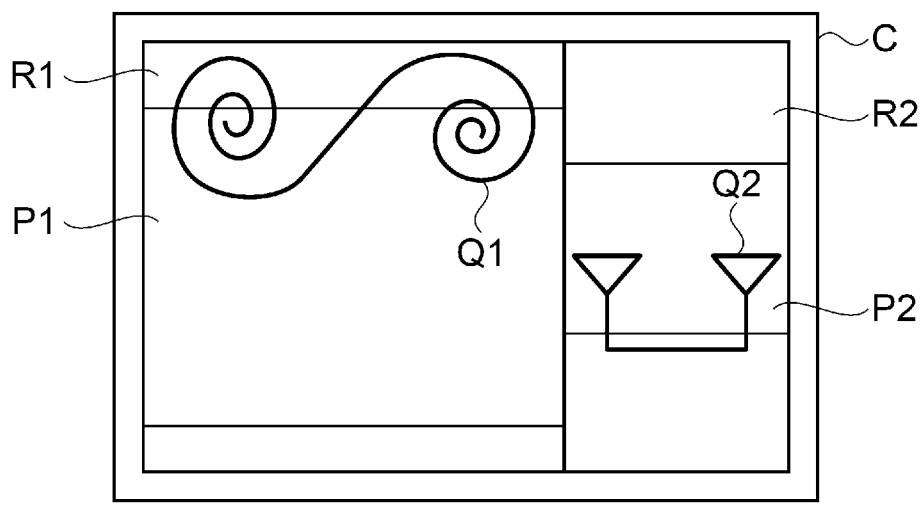
FIG. 10 explains still another example of the display surface displaying a plurality of images.

As shown in FIG. 10, the control circuit 14 may simultaneously change the size of each of the first image P1 and the first drawing object Q1, and the second image P2 and the second drawing object Q2, from the state displayed on the display surface C. FIG. 10 explains the state where the range of the first image P1 and the first drawing object Q1 is enlarged from the state shown in FIG. 8 and where the range of the second image P2 and the second drawing object Q2 is reduced from the state shown in FIG. 8. In this way, even when the size of the image P is changed, the display device 10 links the range of the drawing object Q to the range of the image P and thus fixes the positional relationship between the image P and the drawing object Q.

Figure 11:
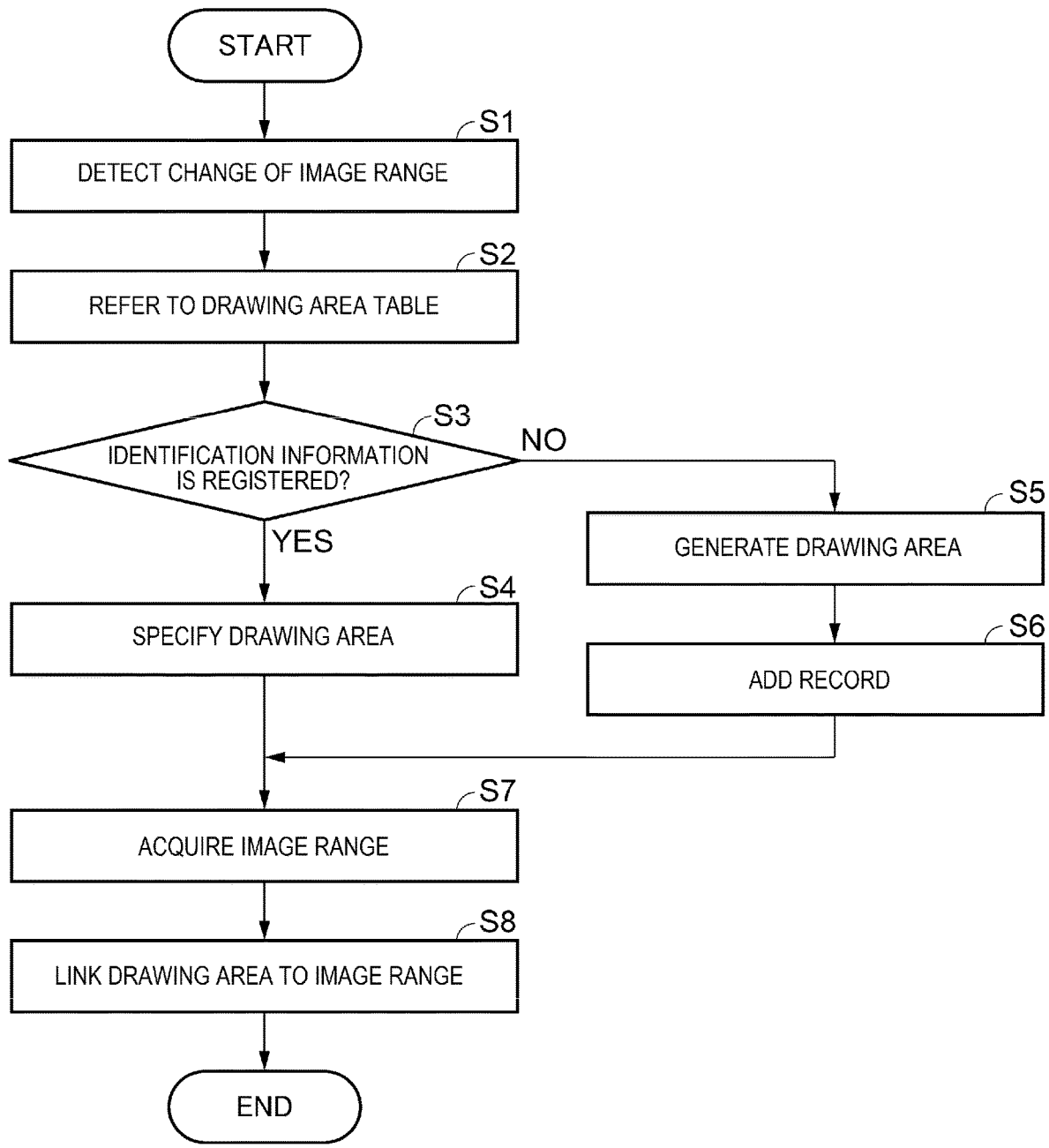
FIG. 11 is a flowchart explaining operations of the display device according to the embodiment.

As a method for controlling the display device 10 according to the embodiment, an example of operations of the display device 10 will now be described with reference to the flowchart of FIG. 11. It is assumed that the display device 10 acquires image information and identification information from the external device 30 and thus displays an image P on the display surface C. The display device 10 generates a drawing object Q from a trajectory of the pointing unit 20 in the drawing area R based on the image P as a reference, and displays the drawing object Q along with the image P on the display surface C. The memory 13 stores the drawing object Q and the identification information in association with each other.

In Step S1, the control circuit 14 detects a change of the range of the image P on the display surface C. That is, when changing the range of the image P in the projection range, the control circuit 14 shifts the processing to step S2. The case where the range of the image P changes may be, for example, the case where the position and size of the image P are changed in response to an operation on the display device 10 by the user, or the case where the path in the I/F 12 to which image information representing the image P is inputted is changed, or the like.

In step S2, the control circuit 14 refers to the drawing area table 131 in the memory 13 and searches for identification information identifying the external device 30 outputting the image information of the image P with respect to which a change of the range is detected in step S1. Next, in step S3, the control circuit 14 determines whether the identification information identifying the external device 30 is registered in the drawing area table 131 or not, as a result of the search in step S2. When the identification information is registered, the control circuit 14 shifts the processing to step S4. When the identification information is not registered, the control circuit 14 shifts the processing to step S5.

In step S4, the control circuit 14 specifies a drawing area associated with the identification information found by the search in step S2. That is, the control circuit 14 specifies a drawing area registered in the same record as the identification information found by the search in step S2, in the drawing area table 131.

In step S5, the control circuit 14 generates a drawing area R associated with the image P and based on the image P as a reference. Thus, in step S6, the control circuit 14 adds a record of the identification information found by the search in step S2, to the drawing area table 131. That is, the control circuit 14 adds a record including fields corresponding to the identification information and the drawing area R associated with the identification information, to the drawing area table 131.

In step S7, the control circuit 14 acquires the range of the image P on the display surface C. That is, the control circuit 14 acquires a change in the position and size of the image P on the display surface C. In step S8, the control circuit 14 links the drawing area R specified in step S4 to the range of the image P. That is, the control circuit 14 links the position and size of the drawing object Q drawn in the drawing area R to the position and size of the image P and thus fixes the positional relationship between the drawing object Q and the image P.

As described above, in the display device 10 according to the embodiment, the drawing object Q drawn in relation to the image P is stored in association with the identification information identifying the external device outputting the image information of the image P. Therefore, there is no need to analyze the content of the drawing object Q and the image P. Thus, when displaying the drawing object Q as linked to the image P, the display device 10 can prevent an increase in processing load due to image analysis or the like.

While the embodiment has been described above, the present disclosure is not limited to the description of the embodiment. The configuration of each part may be replaced with any configuration having a similar function. Any configuration in the embodiment may be omitted or added within the technical scope of the present disclosure. In this way, based on such a description, various alternative embodiments become clear to a person skilled in the art.

For example, in the foregoing embodiment, the display unit 16 is not limited to a projection device projecting light to the display surface C and may be a flat panel display. In this case, a screen where an image is displayed is equivalent to the display surface C. The configuration of the pointing unit 20 and the sensor 17 is not limited to the above example. The pointing unit 20 and the sensor 17 may be any unit having the function of detecting a position on the display surface C. For example, various pointing devices such as a mouse, touch panel, distance sensor, and digitizer can be employed instead of the pointing unit 20 and the sensor 17.

The present disclosure also includes various embodiments that are not described above, such as applying the foregoing individual configurations to each other. The technical scope of the present disclosure is defined only by the specifying matters according to the reasonable claims derived from the foregoing description.

What is claimed is:

1. A method for controlling a display device, the method comprising:
   acquiring, from a first external device, first image information and first identification information identifying the first external device;
   displaying a first image based on the first image information, on a first range of a display surface;
   generating a first drawing object from a trajectory of a pointing unit in a first drawing area on the display surface based on the first image as a reference;
   storing the first drawing object in association with the first identification information into a memory;
   erasing the first image and the first drawing object from the first range;
   displaying the first drawing object associated with the first identification information in the memory, on a second range of the display surface, as linked to the first image, the second range being different from the first range;
   acquiring, from a second external device, second image information that is different from the first image information and second identification information identifying the second external device;
   displaying a second image based on the second image information, on the display surface;
   generating a second drawing object from a trajectory of a pointing unit in a second drawing area on the display surface based on the second image as a reference;
   storing the second drawing object in association with the second identification information into the memory; and
   displaying the second drawing object associated with the second identification information in the memory, on the display surface, as linked to the second image.

2. The method for controlling the display device according to claim 1, wherein
   a position of the first drawing object on the display surface is linked to a position of the first image.

3. The method for controlling the display device according to claim 1, wherein
   a size of the first drawing object on the display surface is linked to a size of the first image.

4. The method for controlling the display device according to claim 1, wherein the first image and the first drawing object, and the second image and the second drawing object, are displayed in such a way as not to be superimposed on each other on the display surface.

5. The method for controlling the display device according to claim 1, wherein
the memory continues the storing of the first drawing object during a stop of the displaying of the first image.

6. The method for controlling the display device according to claim 1, wherein
the first drawing area includes the first image and is broader than the first image, on the display surface.

7. The method for controlling the display device according to claim 1, wherein
the first identification information includes information defined by Extended Display Identification Data.

8. The method for controlling the display device according to claim 1, wherein
the first identification information includes an identifier identifying a user in a network including the first external device.

9. A display device comprising:
an interface acquiring, from an external device, image information and identification information identifying the external device;
a display unit displaying an image based on the image information, on a first range of a display surface;
a generation circuit generating a drawing object from a trajectory of a pointing unit in a drawing area on the display surface based on the image as a reference;
a memory storing the drawing object in association with the identification information; and
a control circuit that:
controls the display unit to erase the image and the drawing object from the first range;
controls the display unit to display the drawing object associated with the identification information in the memory, on a second range of the display surface, as linked to the image, the second range being different from the first range;
controls the interface to acquire, from a second external device, second image information that is different from the first image information and second identification information identifying the second external device;
controls the display unit to display a second image based on the second image information, on the display surface;
controls the generation circuit to generate a second drawing object from a trajectory of a pointing unit in a second drawing area on the display surface based on the second image as a reference;
controls the memory to store the second drawing object in association with the second identification information into the memory; and
controls the display unit to display the second drawing object associated with the second identification information in the memory, on the display surface, as linked to the second image.

* * * * *